(12) United States Patent
Yamamoto et al.

(10) Patent No.: US 8,881,501 B2
(45) Date of Patent: Nov. 11, 2014

(54) PROPELLANT TANK AND VAPOR JET EMITTING DEVICE INCLUDING SAME

(75) Inventors: Takayuki Yamamoto, Sagamihara (JP); Osamu Mori, Sagamihara (JP); Yoshihiro Kishino, Tokyo (JP); Masayuki Tamura, Tokyo (JP); Shohei Koga, Tokyo (JP); Ryoji Imai, Tokyo (JP)

(73) Assignees: Japan Aerospace Exploration Agency (JP); IHI Aerospace Co., Ltd. (JP)

( * ) Notice: Subject to any disclaimer, the term of this patent is extended or adjusted under 35 U.S.C. 154(b) by 876 days.

(21) Appl. No.: 13/039,915

(22) Filed: Mar. 3, 2011

(65) Prior Publication Data
US 2011/0214410 A1 Sep. 8, 2011

(30) Foreign Application Priority Data

Mar. 4, 2010 (JP) .................................. 2010-048224

(51) Int. Cl.
*F02K 9/60* (2006.01)
*B64G 1/40* (2006.01)
*F02K 9/42* (2006.01)

(52) U.S. Cl.
CPC . *B64G 1/402* (2013.01); *F02K 9/42* (2013.01); *F02K 9/605* (2013.01)
USPC ............. 60/257; 60/260; 60/200.1; 60/203.1; 62/45.1

(58) Field of Classification Search
USPC ................ 60/200.1, 203.1, 257, 260; 62/45.1
See application file for complete search history.

(56) References Cited

U.S. PATENT DOCUMENTS

| 3,222,498 | A |   | 12/1965 | Miksch |
| 3,486,302 | A | * | 12/1969 | Paynter ........................... 96/174 |
| 5,901,557 | A | * | 5/1999  | Grayson ......................... 62/45.1 |

FOREIGN PATENT DOCUMENTS

| EP | 2101056       | 9/2009  |
| JP | 2009214695 A  | 9/2009  |
| WO | 2006-106204 A2| 10/2006 |

OTHER PUBLICATIONS

European Search Report issued on May 4, 2011 in counterpart European Patent Application No. 11156836.6.
Japanese Office Action, Japanese Patent Application No. 2010-048224, Sep. 25, 2013, 3 pp.

* cited by examiner

*Primary Examiner* — Phutthiwat Wongwian
*Assistant Examiner* — Steven Sutherland
(74) *Attorney, Agent, or Firm* — Volpe and Koenig, P.C.

(57) ABSTRACT

A propellant tank for storing a liquid propellant A and supplying vapor produced by evaporation of part of the liquid propellant A to an external location comprises a tank body for storing the liquid propellant A, a mesh member arranged inside the tank body to cover a liquid surface of the liquid propellant A to divide an interior of the tank body into a liquid propellant storing area LA and a gas storing area GA by utilizing surface tension of the liquid propellant, and a heater arranged to a gas storing area GA side of the tank body to keep the gas storing area GA at higher temperature than temperature in the liquid propellant storing area LA. The tank body has a propellant inlet open into the liquid propellant storing area LA and a gas outlet open into the gas storing area GA.

1 Claim, 4 Drawing Sheets

PROPELLANT TANK AND VAPOR JET EMITTING DEVICE INCLUDING SAME

BACKGROUND OF THE INVENTION

1. Field of the Invention

This invention relates to a propellant tank mounted on, for example a spacecraft such as an artificial satellite to store a liquid propellant and supply vapor produced by evaporation of part of the liquid propellant to an external location, and a vapor jet emitting device for producing thrust by emitting a jet of the vapor supplied from the propellant tank.

2. Description of the Related Art

A propellant tank of this type constituting the prior art is disclosed in Japanese Patent Application Preliminary Publication No. 2009-214695, for example.

The propellant tank disclosed therein comprises a tank body for storing a liquid propellant, foamed metal filling approximately the whole interior of the tank body, and a heater surrounding the tank body. The tank body has a gas outlet. The tank body stores the liquid propellant in a state that the liquid propellant is held in pores of the foamed metal.

This propellant tank is designed to cause evaporation of part of the propellant in the tank body by heating with the heater. A vapor jet emitting device including this propellant tank is designed to supply vapor produced inside the tank body, to a thruster connected to the gas outlet so that the thruster can produce thrust by emitting a vapor jet.

The aforementioned prior-art propellant tank with weighty foamed metal filling approximately the whole interior of the tank body can store the liquid propellant in a state that it is held in pores of the foamed metal, but cannot be lightweight.

Further, the aforementioned prior-art propellant tank requires that heat be transferred to the whole mass of the foamed metal by heating with the heater in order to cause evaporation of part of the propellant, and thus, requires a much greater amount of external thermal energy than otherwise. These are the problems with the prior art to which a solution is sought.

SUMMARY OF THE INVENTION

The present invention has been made in consideration of the above problems. An object of the present invention is to provide a propellant tank which is lightweight and capable of supplying only vapor produced by evaporation of a propellant to an external location, and requires a smaller amount of external thermal energy, and a vapor jet emitting device including such propellant tank.

The present invention provides a propellant tank for storing a liquid propellant and supplying vapor produced by evaporation of part of the liquid propellant to an external location, comprising a tank body for storing the liquid propellant, and a mesh member arranged inside the tank body to cover a liquid surface of the liquid propellant to divide an interior of the tank body into a liquid propellant storing area and a gas storing area by utilizing surface tension of the liquid propellant, the gas storing area of the tank body being kept at higher temperature than temperature in the liquid propellant storing area, and the tank body having a propellant inlet open into the liquid propellant storing area and a gas outlet open into the gas storing area.

The features of the present invention described above provide an excellent effect that the propellant tank can be lightweight and supply only vapor produced by evaporation of the propellant to an external location, and requires a smaller amount of external thermal energy to cause evaporation of the propellant.

Preferably, the propellant tank further comprises a heating means such as a heater arranged to a gas storing area side of the tank body to keep the gas storing area at higher temperature than the temperature in the liquid propellant storing area.

Such heating means provides an excellent effect that the gas storing area of the tank body is reliably kept at higher temperature than the temperature in the liquid propellant storing area, and thus, reversal of the liquid propellant storing area and the gas storing area is reliably prevented.

Preferably, the propellant tank further comprises a propellant holding member arranged in the liquid propellant storing area of the tank body, adjacent to the mesh member, to hold the liquid propellant in pores thereof.

Such propellant holding member provides an excellent effect that sloshing of the liquid propellant is reduced and heat transfer to the propellant is improved.

Preferably, the propellant tank further comprises a liquid droplet retaining member arranged in the gas storing area of the tank body to cause droplets of the liquid propellant floating in the gas storing area to adhere thereto.

Such liquid droplet retaining member provides an excellent effect that, if droplets of the liquid propellant enter and float in the gas storing area, they are reliably caught and retained on the liquid droplet retaining member.

The present invention also provides a vapor jet emitting device for producing thrust by emitting a jet of vapor produced from a liquid propellant, comprising a propellant tank of the type described above for storing the liquid propellant, and a thruster connected to the gas outlet of the tank body of the propellant tank by a gas supply line to emit a jet of vapor produced inside the tank body and supplied through the gas outlet, the gas supply line between the tank body and the thruster being kept at higher temperature than temperature inside the tank body to prevent liquefaction of vapor in the gas supply line.

The features of the present invention described above provide an excellent effect that the vapor jet emitting device can be a lightweight and simple system as a whole.

Preferably, the vapor jet emitting device further comprises a control section for obtaining temperature and pressure in the gas storing area of the tank body, setting a lower limit to which the pressure in the gas storing area is allowed to decrease by vapor discharge through the gas outlet, on the basis of a minimum pressure value allowing a liquid film of the liquid propellant to be maintained on the mesh member, calculating "on" time for a pulse causing vapor discharge through the gas outlet so that the vapor discharge will not result in a pressure decrease below the lower limit, and activating the thruster by feeding a pulse with the "on" time calculated.

Such control section provides an excellent effect that break of the liquid film on the mesh member, which results in supply of the propellant in liquid form, is prevented.

In the propellant tank according to the present invention, the mesh member arranged inside the tank body causes the liquid propellant to form a liquid film on it by surface tension, thereby dividing the interior of the tank body into a liquid propellant storing area and a gas storing area. In addition, the gas storing area is kept at higher temperature than temperature in the liquid propellant storing area. This prevents reversal of the liquid propellant storing area and the gas storing area and establishes almost complete separation between a liquid layer and a gas layer inside the tank body, and thus, enables supply of only vapor produced by evaporation of the propellant to an external location.

Further, the propellant tank according to the present invention, which does not require that the foamed metal fill approximately the whole interior of the tank body, can be lightweight.

In the propellant tank according to the present invention, the tank body may be made of a material such as aluminum or SUS (stainless used steel). The mesh member may be made of a material such as SUS or titanium. The mesh size may be chosen within a range of values ensuring that the liquid propellant forms a liquid film on the mesh member by surface tension at any phase of the satellite. Here, the "mesh" refers to not only a common net structure, but also a porous structure that a sintered metal has, and a porous structure made by boring a lot of minute holes in a plate.

The liquid propellant to be stored in the tank body of the propellant tank according to the present invention may be chosen from those which easily evaporate without heating. It may be isobutane, which is a liquefied petroleum gas, or an alternative for chlorofluorocarbon, such as HFC-134a, for example. HFC-134a is however preferable because it is non-flammable and atoxic, and does not cause corrosion of the tank body and the mesh member.

In the propellant tank according to the present invention, in place of the heating means such as a heater, solar thermal radiation may be used to keep the gas storing area of the tank body at higher temperature than the temperature in the liquid propellant storing area.

When the heating means such as a heater is used for this purpose, the heating means may be arranged either outside or inside the tank body. It is however preferable to arrange it outside the tank body, because in that case, the heating means dose not require insulating.

The heating means such as a heater, provided in this manner, can keep the gas storing area of the tank body at higher temperature than the temperature in the liquid propellant storing area, thereby reliably preventing reversal of the liquid propellant storing area and the gas storing area.

When solar thermal radiation is used for the above purpose, it is desirable to control the attitude of a spacecraft and the orientation of a reflection panel so that sunlight will desirably always impinge on the gas storing area side of the tank body.

The use of solar thermal radiation obviates the need to mount a heating means such as a heater, resulting in a more lightweight propellant tank.

Temperature in the gas storing area is measured with a temperature sensor provided on the gas storing area side of the tank body, while temperature in the liquid propellant storing area, or temperature of the liquid propellant is measured with a temperature sensor provided on the liquid propellant area side of the tank body. The gas supply line, or piping may be kept at higher temperature than the temperature inside the tank body by using either a heating means such as a heater or solar thermal radiation, as is the case with the tank body.

The propellant holding member arranged in the liquid propellant storing area of the tank body of the propellant tank according to the present invention may be made of foam of a lightweight and high thermal conductive metal, such as nickel. The foamed metal arranged adjacent to the mesh member can reduce sloshing of the liquid propellant and improve heat transfer to the propellant.

The liquid droplet retaining member arranged in the gas storing area of the propellant tank according to the present invention may be a flat plate of a lightweight metal, such as aluminum. The propellant tank according to the present invention intended to be mounted on a spin-stabilized satellite should have a plurality of such flat plates arranged around the axis of the propellant tank (spin axis) at appropriate intervals so that droplets of the liquid propellant floating in the gas storing area can be reliably caught and retained thereon.

The propellant tank according to the present invention however does not necessarily need to have the propellant holding member or the liquid droplet retaining member.

The vapor jet emitting device according to the present invention does not require a gas accumulator or a combustion device, and thus, can be a more lightweight and simpler system than otherwise.

The control section in the vapor jet emitting device according to the present invention sets a lower limit to which the pressure in the gas storing area is allowed to decrease by vapor discharge through the gas outlet, calculates "on" time for a pulse causing vapor discharge through the gas outlet so that the vapor discharge will not result in a pressure decrease below the lower limit, and activates the thruster by feeding a pulse with the "on" time calculated. This ensures that only the vapor produced by evaporation of the liquid propellant is supplied from the propellant tank.

The vapor jet emitting device according to the present invention may be arranged such that the above control is performed by the control section on the basis of manual operation.

The propellant tank or the vapor jet emitting device according to the present invention can be mounted on spin-stabilized satellites and 3-axis stabilized satellites placed in the microgravity environment.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

With reference to the drawings attached, a propellant tank and a vapor jet emitting device according to the present invention will be described below.

FIGS. 1 to 4 show a vapor jet emitting device including a propellant tank according to an embodiment of the present invention. Here, the embodiment of the present invention will be described with an example in which a vapor jet emitting device including a propellant tank is mounted on a spin-stabilized satellite.

Figure 1:
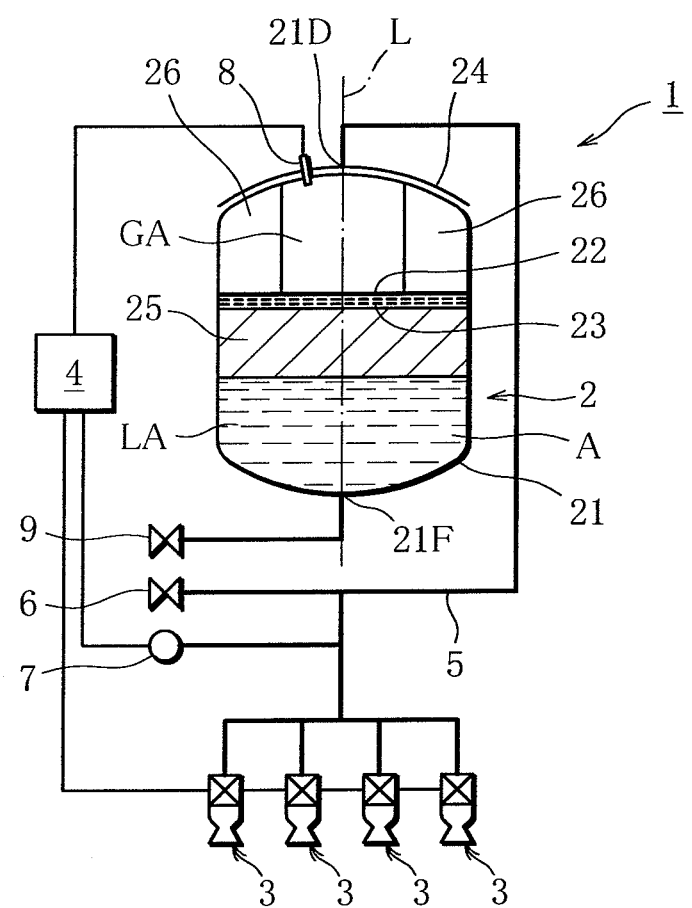
FIG. 1 is a schematic diagram illustrating the configuration of a vapor jet emitting device including a propellant tank, according to an embodiment of the present invention.

As seen in FIG. 1, a vapor jet emitting device 1 comprises a propellant tank 2, a plurality of thrusters 3 and a control section 4 as main components.

The propellant tank 2 includes a cylindrical tank body 21 for storing a liquid propellant A. The tank body 21 is made of aluminum and has an axis L to be aligned with a spin axis of the spin-stabilized satellite. The tank body has a gas outlet 21D at the top and a propellant inlet 21F at the bottom, each located on the axis L. The terms "top" and "bottom" are used with respect to the propellant tank shown in FIG. 1. The spin-stabilized satellite is launched with the propellant tank arranged with this top side up.

Figure 2:
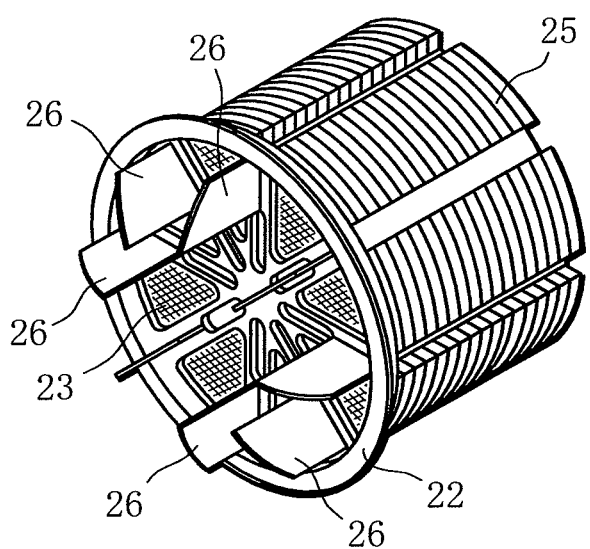
FIG. 2 is a perspective view illustrating a component to be arranged inside a tank body of the propellant tank of FIG. 1.

As also seen in FIG. 2, the propellant tank 2 includes a mesh member 23 fixed by means of a support member 22 to cover the liquid surface of the liquid propellant A, inside the tank body 21. The mesh member 23 is made of SUS (stainless used steel) and provided to divide the interior of the tank body 21 into a liquid propellant storing area LA adjacent to the propellant inlet 21F and a gas storing area GA adjacent to the gas outlet 21D, by utilizing surface tension of the liquid propellant. The mesh member 23 has a mesh size determined to ensure that the liquid propellant A forms a liquid film on the mesh member by surface tension, and thus, is held in the liquid propellant storing area LA, at any phase of the spin-stabilized satellite.

The propellant tank 2 further includes, as a heating means, a heater 24 arranged outside the tank body 21, adjacent to the gas storing area GA. The heater 24 is provided to heat the gas storing area GA to keep the gas storing area GA always at higher temperature than the temperature in the liquid propellant storing area LA, thereby preventing reversal of the gas storing area GA and the liquid propellant storing area LA.

The temperature in the gas storing area GA is measured with a temperature sensor 8 described below, while the temperature in the liquid propellant storing area LA, or temperature of the liquid propellant A is measured with a propellant temperature sensor not shown.

The propellant tank 2 has foamed metal (propellant holding member) 25 arranged in the liquid storing area LA of the tank body 21, adjacent to the mesh member 23, to hold the liquid propellant A in its pores.

The propellant tank 2 further has a plurality of flat plates (liquid droplet retaining member) 26 to cause droplets of the liquid propellant floating in the gas storing area GA of the tank body 21 to adhere to them. The flat plates 26 are arranged around the axis L of the tank body 21 at intervals of 45° and fixed to a support member 22.

In the vapor jet emitting device 1, the thrusters 3 are connected to the gas outlet 21D of the tank body 21 of the propellant tank 2 by piping 5. On the piping 5, or gas supply line, a liquid introduction/discharge valve 6, a pressure meter 7, and a piping temperature instrument not shown are fitted. By keeping the piping 5 always at higher temperature than the temperature in the tank body 21 with a heating means such as a heater, vapor discharged through the gas outlet 21D is prevented from becoming liquefied in the piping 5.

The control section 4 of the vapor jet emitting device 1 is electrically connected to the gas storing area temperature sensor 8 fitted to the tank body 21 of the propellant tank 2, the pressure meter 7, and the thrusters 3. Reference character 9 in FIG. 1 indicates a liquid introduction/discharge valve to allow a flow to or from the propellant inlet 21F.

Figure 3:
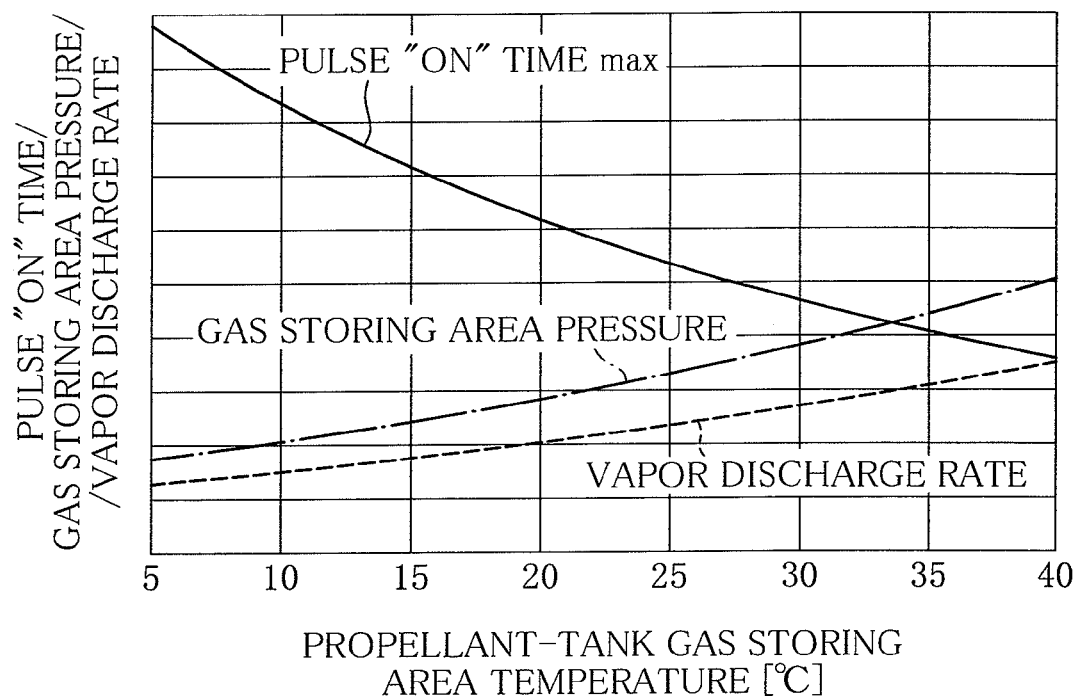
FIG. 3 is a graph representing relation between temperature in a gas storing area in the tank and pulse "on" time, on the basis of which control over the vapor jet emitting device of FIG. 1 is performed.

In the present embodiment, the control section 4 performs control on the basis of relation between temperature in the gas storing area GA of the tank body 21 and pulse "on" time, represented by a graph shown in FIG. 3.

Figure 4:
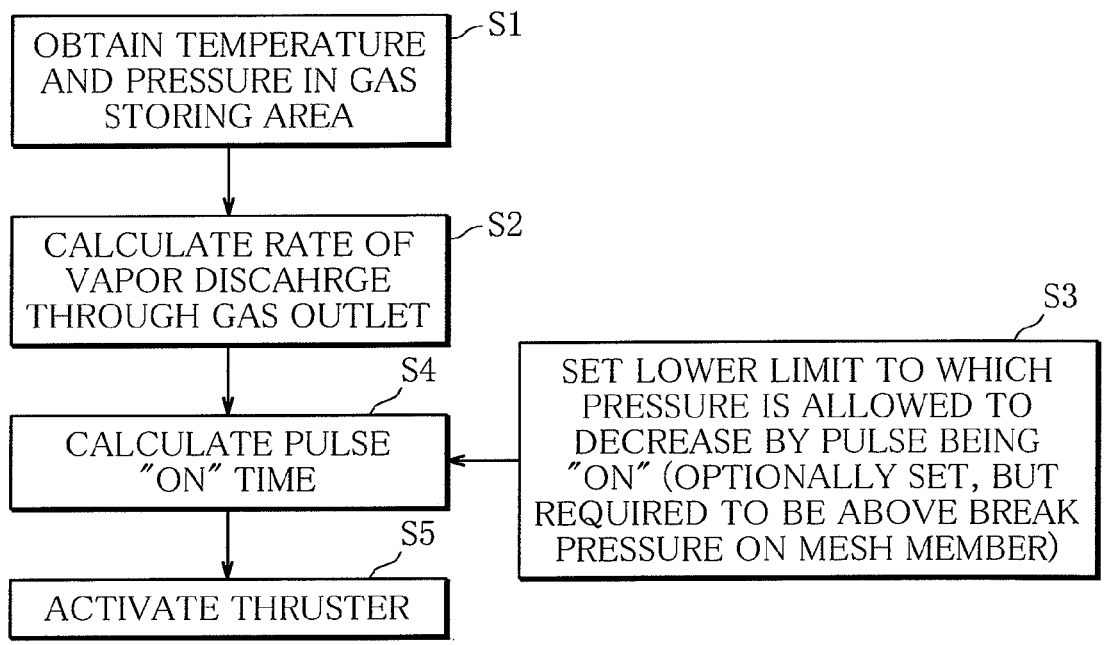
FIG. 4 is a flow chart giving a summary of control over the vapor jet emitting device of FIG. 1.

The control performed by the control section 4 is open loop control to limit the pulse "on" time on the basis of temperature and pressure in the gas storing area GA. As shown in FIG. 4, first at step S1, temperature and pressure in the gas storing area GA of the tank body 21 of the propellant tank 2 are obtained from the temperature sensor 8 and the pressure meter 7. As seen in FIG. 3, as the temperature in the gas storing area GA increases, the pressure in the gas storing area GA increases, so that vapor discharges through the gas outlet 21D at an increased rate. Thus, at step S2, the rate of vapor discharge through the gas outlet 21D is calculated from the pressure in the gas storing area GA.

When vapor discharges through the gas outlet 21D at an increased rate, the pulse "on" time needs to be shortened. Thus, at step S3, a lower limit to which the pressure in the gas storing area GA is allowed to decrease by vapor discharge through the gas outlet 21D is set on the basis of pressure values allowing the liquid film of the liquid propellant to be maintained on the mesh member 23 (break pressure on the mesh member 23). Specifically, the lower limit to which the pressure is allowed to decrease by the pulse being "on" is set above the break pressure.

Then, at step S4, the "on" time for a pulse causing vapor discharge through the gas outlet 21D is so calculated that the vapor discharge will not result in a pressure decrease below the lower limit, and at step S5, the thrusters 3 are activated by feeding a pulse with the "on" time calculated.

As stated above, in the propellant tank 2 according to the present embodiment, the mesh member 23 arranged inside the tank body 21 causes the liquid propellant to form a liquid film on it by surface tension, thereby dividing the interior of the tank body 21 into a liquid propellant storing area LA and a gas storing area GA. In addition, of the two areas, only the gas storing area GA is heated with the heater 24 to ensure that it is kept at higher temperature than the temperature in the liquid propellant storing area LA. This not only establishes almost complete separation between a liquid layer and a gas layer inside the tank body 21 but also prevents reversal of the two layers, and thus, enables only the vapor produced by evaporation of the propellant A to be supplied to the thrusters 3.

Unlike the prior art, the foamed metal does not need to fill approximately the whole interior of the tank body, resulting in a great reduction in weight as compared with the prior art.

Further, in the propellant tank 2 according to the present embodiment, the foamed metal 25 is arranged adjacent to the mesh member 23, which reduces sloshing of the liquid propellant A and improves heat transfer to the propellant A.

Further, the propellant tank 2 according to the present embodiment has, in the gas storing area GA, eight flat plates 26 arranged around the axis L of the tank body 21 at intervals of 45°. Thus, if droplets of the liquid propellant enter and float in the gas storing area GA, the eight flat plates 26 rotating around the axis L can reliably catch and retain such liquid droplets by causing the liquid droplets to adhere to them.

The vapor jet emitting device 1 according to the present embodiment does not require a gas accumulator or a combustion device, and thus, can be a more lightweight and simpler system than otherwise. In addition, the control section 4 controls the "on" time for a pulse causing vapor discharge to prevent discharge of liquid droplets from the propellant tank 2 through the gas outlet 21D. As a result, only the vapor produced by evaporation of the propellant A is supplied from the propellant tank 2 to the thrusters 3.

In the above, an embodiment of the present invention has been described with an example in which a vapor jet emitting device including a propellant tank is mounted on a spin-stabilized satellite. The application of the present invention is however not limited to this. A propellant tank or a vapor jet emitting device according to the present invention can be mounted on a 3-axis stabilized satellite.

Although, in the described embodiment, a heater 24 is arranged outside the tank body 21, adjacent to the gas storing area GA, as a heating means to keep the gas storing area GA of the tank body 21 at higher temperature than that in the propellant storing area LA, the configuration is not limited to this. For example, the heater 24 may be arranged inside the tank body 21, in the gas storing area GA, or a heating means other than the heater 24 may be used as a heat source.

Alternatively, solar thermal radiation may be used to keep the gas storing area GA at higher temperature than that in the liquid propellant storing area LA. In the use of solar thermal radiation, the attitude of a spacecraft and the orientation of a reflection panel are controlled so that sunlight will desirably always impinge on the gas storing area GA side of the tank body 21.

Although, in the described embodiment, foamed metal 25 as a propellant holding member and a plurality of flat plates 26 as a liquid droplet retaining member are provided inside the tank body 21, the configuration is not limited to this. The tank body 21 does not necessarily need to have foamed metal 25 or flat plates 26.

What is claimed is:

1. A vapor jet emitting device for producing thrust by emitting a jet of vapor produced from a liquid propellant, comprising:

a propellant tank for storing a liquid propellant and supplying vapor produced by evaporation of part of the liquid propellant to an external location, including a tank body for storing the liquid propellant, and a mesh member arranged inside the tank body to cover a liquid surface of the liquid propellant to divide an interior of the tank body into a liquid propellant storing area and a gas storing area by utilizing surface tension of the liquid propellant, wherein the gas storing area of the tank body being kept at higher temperature than temperature in the liquid propellant storing area, and the tank body having a propellant inlet open into the liquid propellant storing area and a gas outlet open into the gas storing area;

a thruster connected to the gas outlet of the tank body of the propellant tank by a gas supply line to emit a jet of vapor produced inside the tank body and supplied through the gas outlet; and a control section for obtaining temperature and pressure in the gas storing area of the tank body, setting a lower limit to which the pressure in the gas storing area is allowed to decrease by vapor discharge through the gas outlet, on the basis of a minimum pressure value allowing a liquid film of the liquid propellant to be maintained on the mesh member, calculating "on" time for a pulse causing vapor discharge through the gas outlet so that the vapor discharge will not result in a pressure decrease below the lower limit, and activating the thruster by feeding a pulse with the "on" time calculated.

* * * * *